(12) United States Patent
Ruebsamen et al.

(10) Patent No.: US 8,002,094 B2
(45) Date of Patent: Aug. 23, 2011

(54) VIBRATION ISOLATION APPARATUS AND METHODS OF MANUFACTURE

(75) Inventors: Dale T. Ruebsamen, Glendale, AZ (US); James H. Boyd, Phoenix, AZ (US); Toren S. Davis, Peoria, AZ (US); Joseph E. Vecera, Glendale, AZ (US)

(73) Assignee: Honeywell International Inc., Morristown, NJ (US)

( * ) Notice: Subject to any disclaimer, the term of this patent is extended or adjusted under 35 U.S.C. 154(b) by 1249 days.

(21) Appl. No.: 11/651,163

(22) Filed: Jan. 9, 2007

(65) Prior Publication Data

US 2008/0164644 A1  Jul. 10, 2008

(51) Int. Cl.
*F16F 7/10* (2006.01)
(52) U.S. Cl. ........................................ 188/379; 188/380
(58) Field of Classification Search .................. 188/378, 188/379, 380; 267/140, 141, 287
See application file for complete search history.

(56) References Cited

U.S. PATENT DOCUMENTS

| | | | |
|---|---|---|---|
| 3,085,657 A * | 4/1963 | Preis | 188/380 |
| 3,132,855 A * | 5/1964 | Davis | 267/287 |
| 3,866,896 A * | 2/1975 | Wehner | 267/287 |
| 4,928,198 A | 5/1990 | Domschat | |
| 5,564,537 A | 10/1996 | Shoureshi | |
| 5,816,373 A | 10/1998 | Osterberg et al. | |
| 6,315,094 B1 | 11/2001 | Griffin et al. | |
| 6,619,638 B1 * | 9/2003 | Spencer | 267/287 |
| 6,681,908 B2 | 1/2004 | Davis | |
| 2005/0011714 A1 * | 1/2005 | Menzel et al. | 188/380 |

* cited by examiner

*Primary Examiner* — Robert Siconolfi
*Assistant Examiner* — Stephen Bowes
(74) *Attorney, Agent, or Firm* — Ingrassia Fisher & Lorenz, P.C.

(57) ABSTRACT

A vibration isolation apparatus is provided that includes a main spring and a tuned mass damper. The main spring has a first end and a second end, and is configured to resonate when vibrated within a predetermined frequency range with a first axial surge mode having a magnitude. The tuned mass damper is coupled to the main spring at a first axial position located substantially equidistantly between the main spring first end and the main spring second end and is configured to reduce the first axial surge mode magnitude at least 50% when the main spring is vibrated within the predetermined frequency range. Methods of manufacturing the vibration isolation apparatus are also provided.

12 Claims, 7 Drawing Sheets

VIBRATION ISOLATION APPARATUS AND METHODS OF MANUFACTURE

TECHNICAL FIELD

The inventive subject matter generally relates to vibration isolation apparatus and methods of manufacturing the vibration isolation apparatus.

BACKGROUND

A precision pointing system carrying a sensor, such as a telescope as its payload, may be susceptible to disturbances that produce structural vibrations and, consequently, pointing errors. Such vibrations may be attributed to mechanical components or assemblies, such as reaction wheel assemblies that are used as actuators in the precision pointing system. For the most part, because these systems tend not to have significant, inherent damping, these structural vibrations may degrade system performance and even cause structural fatigue over time.

To minimize the vibrations, an isolation strut is typically used to damp the structure and isolate the payload. One type of isolation strut operates as a three-parameter vibration isolation system and includes a hollow shaft, a piston, and a main spring. The piston receives vibration from the payload and is configured to slidably move through the shaft in response to the vibration. A flange extends radially from a midsection of the piston and has a top surface that is coupled to a first sealed bellows and a bottom surface that is coupled to a second sealed bellows. Each of the bellows has a chamber that is filled with fluid. Thus, when the piston moves axially through the shaft, fluid flows from one of the bellows chambers to the other. The shaft and piston are disposed within the main spring, which provides axial stiffness to the isolation strut in general.

During system operation, the isolation strut may be subjected to a frequency that causes the main spring to resonate. In some cases, the degree of resonance is such that it interferes with the capability of the strut to dampen vibrations. In other cases, the resonance may degrade the structural integrity of the spring, and the spring may become prematurely worn.

To attenuate the degree of resonance, one or more elastomer pads are typically contacted with or attached to the main spring. However, this configuration has drawbacks. For example, the elastomer pads unpredictably creep when exposed to certain temperatures, and thus, may not attenuate the resonance as desired. Additionally, the elastomer pads, which are typically made of insulating material, may block electrical and/or thermal conduction thereby creating electromagnetic interference and overheating issues.

Accordingly, it is desirable to have a vibration isolation apparatus that has improved damping capabilities. In addition, it is desirable to have a vibration isolation apparatus that does not resonate significantly when subjected to predetermined frequency ranges. Furthermore, other desirable features and characteristics of the present inventive subject matter will become apparent from the subsequent detailed description of the inventive subject matter and the appended claims, taken in conjunction with the accompanying drawings and this background of the inventive subject matter.

BRIEF SUMMARY

In an embodiment, a vibration isolation apparatus is provided that includes a main spring and a tuned mass damper. The main spring has a first end and a second end and is configured to resonate when vibrated within a predetermined frequency range with a first axial surge mode having a magnitude. The first tuned mass damper is coupled to the main spring at a first axial position located substantially equidistantly between the main spring first end and the main spring second end and is configured to reduce the first axial surge mode magnitude at least 50% when the main spring is vibrated within the predetermined frequency range.

In another embodiment, a method of manufacturing the vibration isolation apparatus are provided. The method includes coupling a tuned mass damper to a main spring at a first axial position located substantially equidistantly between a main spring first end and a main spring second end.

BRIEF DESCRIPTION OF THE DRAWINGS

The inventive subject matter will hereinafter be described in conjunction with the following drawing figures, wherein like numerals denote like elements.

DETAILED DESCRIPTION

The following detailed description of the inventive subject matter is merely exemplary in nature and is not intended to limit the inventive subject matter or the application and uses of the inventive subject matter. While the isolation struts are discussed with reference to exemplary embodiments, any one of numerous other embodiments of a vibration isolation apparatus having a main spring may be implemented as well. For example, it will be appreciated that the inventive subject matter may be implemented any single parameter or dual parameter vibration isolation apparatus that includes a main spring. Furthermore, there is no intention to be bound by any theory presented in the preceding background or the following detailed description.

Figure 1:
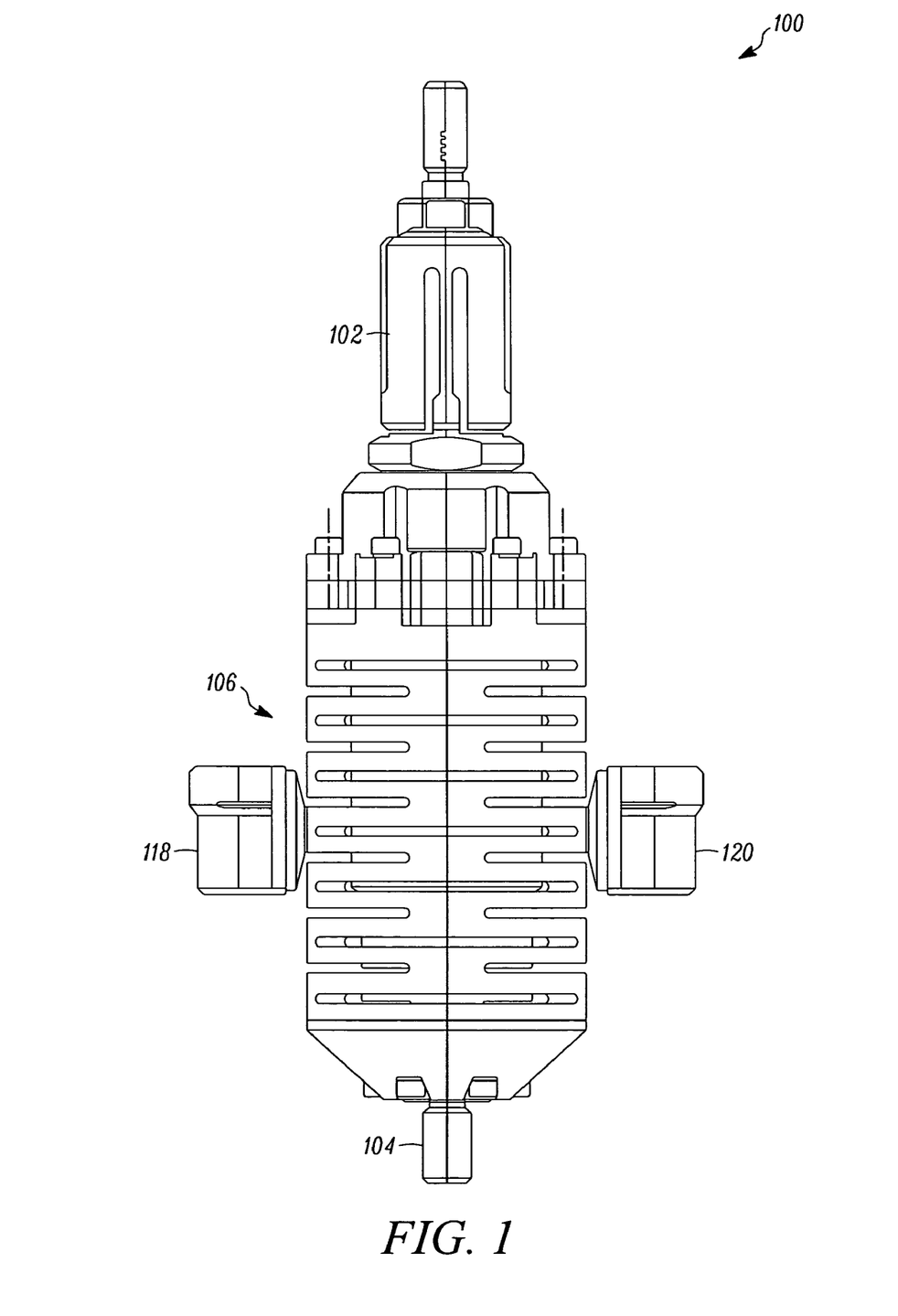
FIG. 1 is a side view of a vibration isolation apparatus in accordance with an exemplary embodiment.
Figure 2:
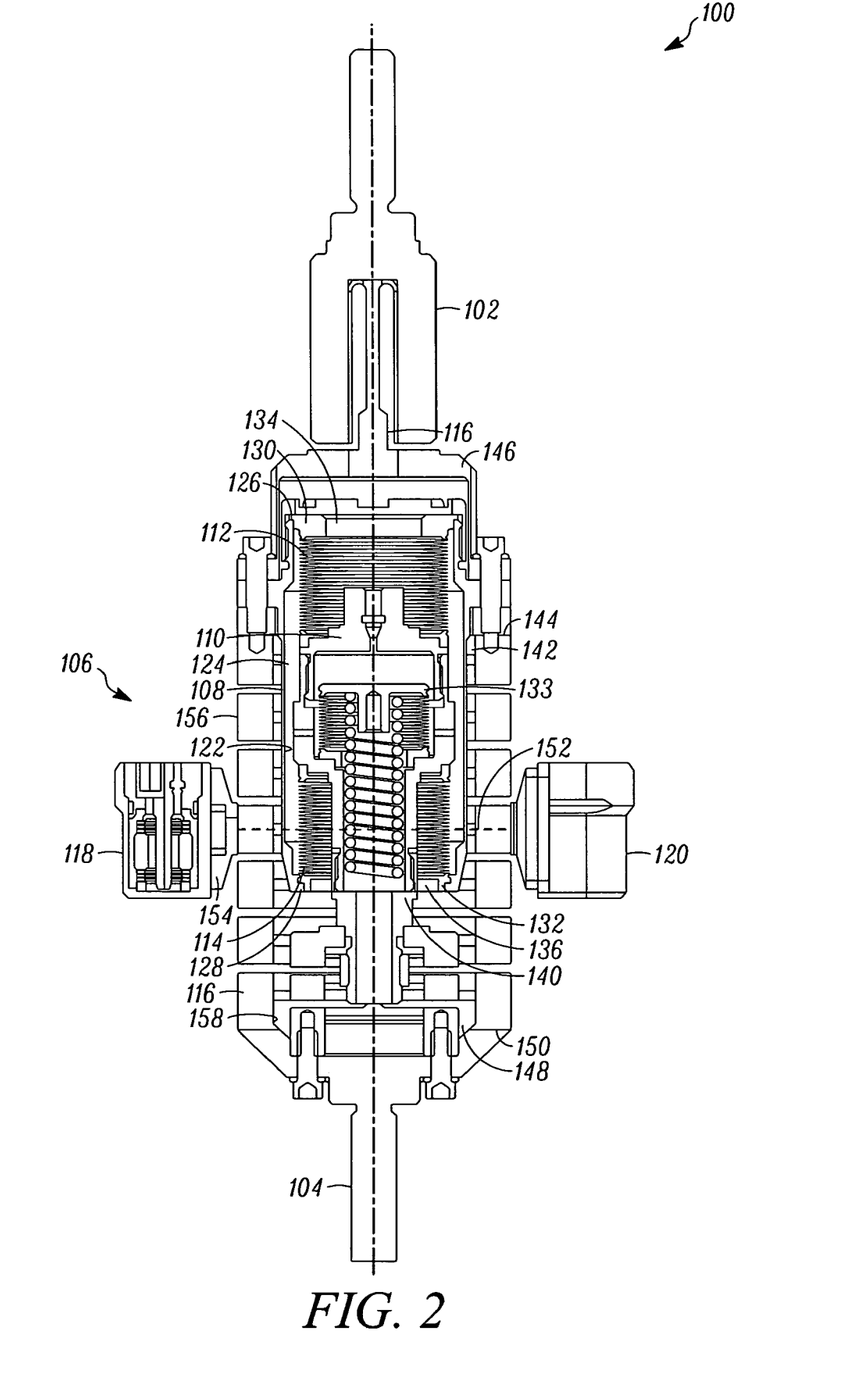
FIG. 2 is a cross-sectional view of the a vibration isolation apparatus shown in FIG. 1 in accordance with an exemplary embodiment.

FIGS. 1 and 2 show a side view and a cross-sectional view of a vibration isolation apparatus 100 in accordance with an exemplary embodiment. In one embodiment, the vibration isolation apparatus 100 may be a strut. The vibration isolation apparatus 100 includes a pivot 102, a support 104, and an isolation assembly 106 extending therebetween. The pivot 102 receives vibratory motion from a non-illustrated payload, which may be a telescope or a reaction wheel assembly for example, but not by way of limitation. The support 104 attaches the isolation assembly 106 to a non-illustrated base. The support 104 may either be integrally formed as part of or may be a separate piece coupled to the isolation assembly 106. Although the support 104 is illustrated as being on an opposite end of the isolation assembly 106 from the pivot 102, it will be appreciated that the support 104 may be formed on or coupled to any suitable part of the isolation assembly 106.

As shown in more detail in FIG. 2, the isolation assembly 106 includes a shaft 108, a piston 110, first and second bellows 112, 114, a main spring 116, and at least one tuned mass damper 118, 120 (only one of which is shown in cross section) in an embodiment. The shaft 108 is generally cylindrical and has an inner surface 122 that defines passage 124 housing the piston 110 and bellows 112, 114 therein. The shaft 108 has ends 126, 128 that are covered with end caps 130, 132, and the end caps 130, 132 each include openings 134, 136. The piston 110 extends through the shaft 108 and is attached to the first shaft end cap 130 via the first bellows 112 and to the second shaft end cap 132 via the second bellows 114. The piston 110 also includes one end 140 that extends through the second shaft end cap opening 136 to attach to the support 104. Fluid (not shown), such as a viscous liquid or a gas, fills the passage 124 to provide damping when the piston 110 receives vibration from the pivot 102. The isolation assembly 106 may also include a temperature compensator 133 to compensate for thermal expansion that may be experienced by the fluid.

The main spring 116 is generally cylindrical and houses at least a portion of the shaft 108, piston 110, and bellows 112, 114 therein. The main spring 116 includes a first opening 142 at one end 144 through which a portion of the shaft 108 extends. The first opening end 144 is coupled to the pivot 108 via an attachment cap 146 that encloses the shaft 108, piston 110, and bellows 112, 114 within the main spring 116. The main spring 116 also includes a second opening 148 at the opposite end 150, which is used to attach the main spring 116 to the support 104.

During operation, the main spring 116 may resonate with one or more axial surge modes when vibrated within a predetermined frequency range. An axial surge mode is a frequency which causes the main spring 116 to vibrate axially. The predetermined frequency range may be a range that includes the natural frequency of the main spring 116. In some cases, the resonance may interfere with damping capabilities of the vibration isolation apparatus 100. To attenuate the axial surge mode, one or more tuned mass dampers 118, 120 are mounted to the main spring 116 in an embodiment.

The tuned mass dampers 118, 120 are disposed on the main spring 116 at a first axial position 152 (shown as a dotted line). The first axial position 152 is located substantially equidistantly from the ends 144, 150 of the main spring 116, where the term "substantially equidistantly" means within a range between about 40% to about 60% of the total distance from either end. Although two dampers 118, 120 are shown in FIGS. 1 and 2, more may alternatively be included. In these cases, no matter the particular total number, the dampers are preferably substantially equidistantly spaced around the main spring 116. If two dampers are included, the dampers may be substantially equidistantly spaced by being positioned at 0°±5° and 180°±5° around the main spring 116. If three dampers are included, the dampers may be substantially equidistantly spaced by being positioned at 0°±5°, 120°±5° and 240°±5° around the main spring 116, and so on. In another embodiment, a single tuned mass damper is employed.

The tuned mass dampers 118, 120 may be mounted to the main spring 116 in any one of numerous suitable manners. In one exemplary embodiment, the tuned mass dampers 118, 120 are directly attached to the main spring 116. In another exemplary embodiment, a flange 154 is mounted directly to the main spring 116 and the tuned mass dampers 118, 120 are attached to the flange 154, as shown in FIG. 2.

Figure 3:
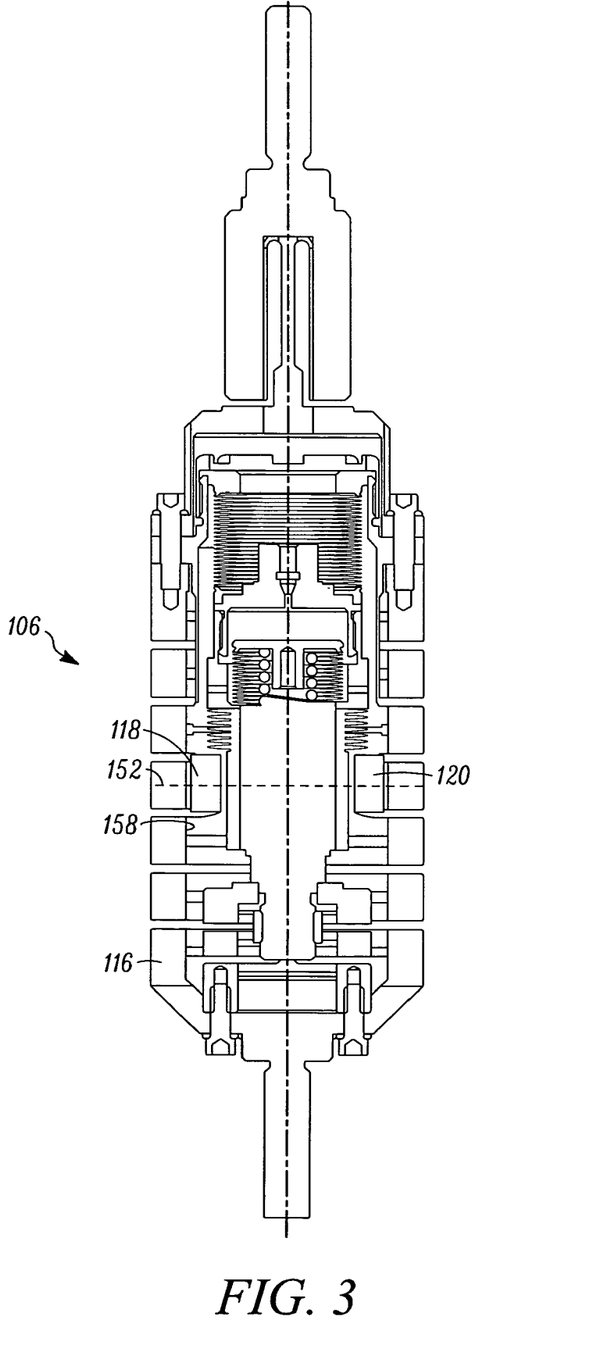
FIG. 3 is a side view of a vibration isolation apparatus in accordance with another exemplary embodiment.

Although shown attached to an outer surface 156 of the main spring 116, the tuned mass dampers 118, 120 may alternatively be attached to an inner surface. FIG. 3 illustrates the vibration isolation apparatus 106 including the main spring 116 having an inner surface 158. Two tuned mass dampers 118, 120 are attached to the inner surface 158. To maintain damping capabilities in such an embodiment, the tuned mass dampers 118, 120 are disposed such that they do not contact any of the components that are contained within the main spring 116.

Figure 4:
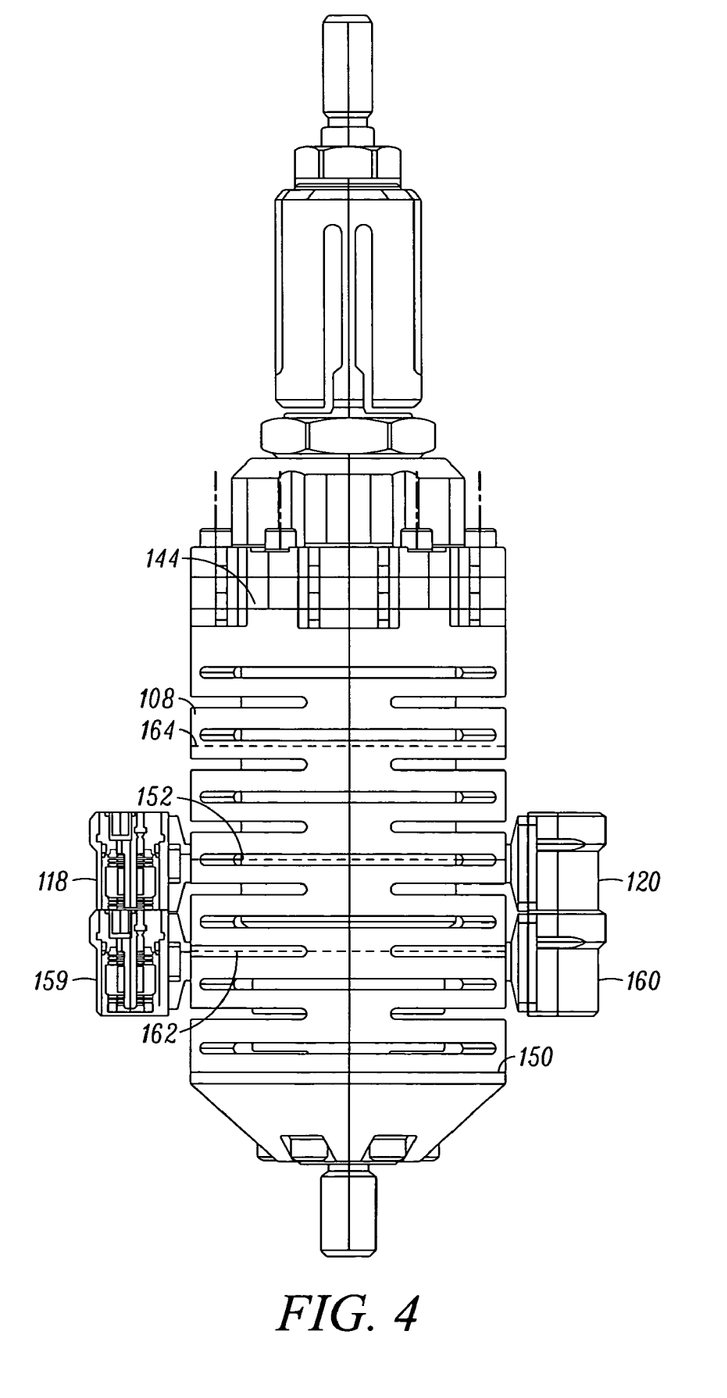
FIG. 4 is a side view of a vibration isolation apparatus in accordance with still another exemplary embodiment.

The main spring 116 may resonate with more than one axial surge mode. Thus, additional tuned mass dampers may be included to damp those modes. For example as shown in FIG. 4, one or more tuned mass dampers 159, 160 may be coupled to the main spring 116 at a second axial position 162 (shown as a dotted line) located between the first axial position 152 and one of the main spring ends 150. In other embodiments, tuned mass dampers 159, 160 may be coupled to the second axial position 162 and a third axial position 164 (tuned mass dampers not shown) between the first axial position 152 and the other main spring end 144.

Figure 5:
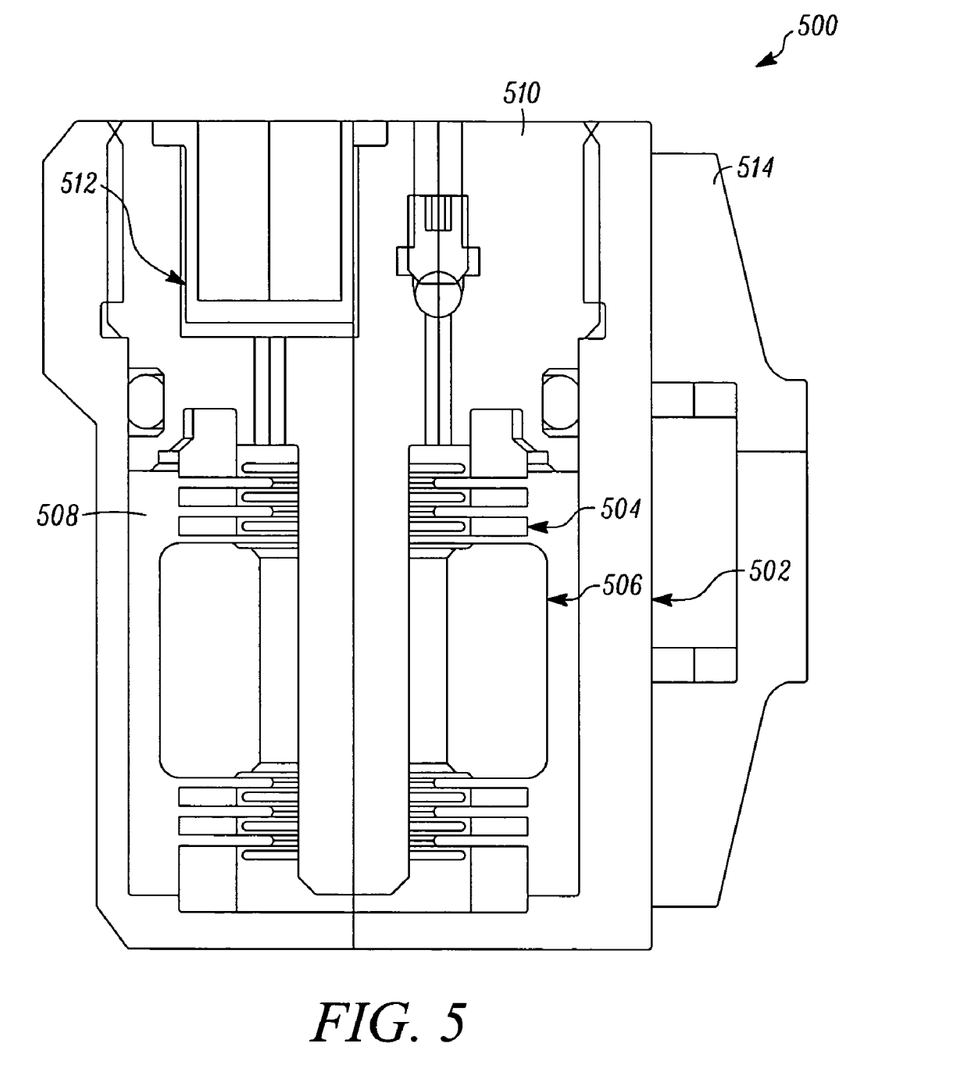
FIG. 5 is a cross sectional-view of a tuned mass damper that may be implemented as part of the vibration isolation apparatus shown in FIG. 2, FIG. 3, or FIG. 4 in accordance with an exemplary embodiment.

Turning to FIG. 5, a tuned mass damper 500 is shown in cross section in accordance with an exemplary embodiment. The tuned mass damper 500 includes a cylindrical housing 502, and a tuned mass damper spring 504, an active mass 506, fluid 508, and an end cap 510. The active mass 506 is disposed on the tuned mass damper spring 504 and both are located within the cylindrical housing 502. The fluid 508 fills the cylindrical housing 502 and is enclosed therein by the end cap 510. A temperature compensator 512 may be included with the end cap 510 and disposed within the cylindrical housing 502 to compensate for thermal expansion of the fluid 508. The tuned mass damper 500 may also optionally include a flange 514 for coupling to the main spring 116 (FIG. 1). Referring also to FIG. 2, when the tuned mass damper 500 is coupled to the main spring 116, the tuned mass damper spring 504 is preferably disposed substantially parallel with the main spring 116.

Returning now to FIG. 1, in addition to appropriately coupling the tuned mass dampers 118, 120 to the main spring 116, the tuned mass dampers 118, 120 may be specifically sized to more accurately attenuate one or more particular surge modes. Sizing may be dependent on a particular application in which the vibration isolation apparatus 100 will be used. Moreover, sizing may be determined using any one of numerous conventional sizing calculations.

As mentioned above, coupling the tuned mass dampers to specific locations on the main spring 116 (e.g. first axial position 152 (FIG. 1), second axial position 162 (FIG. 4), third axial position 164 (FIG. 4)) attenuates one or more axial surge modes that may be experienced by the main spring 116. This is demonstrated in the following example, which should not be construed as in any way limiting the scope of the inventive subject matter.

A bipod test setup was used that was configured to include two vibration isolation apparatus, a suspended payload mass, and a platform. An end of each vibration isolation apparatus was coupled to the suspended payload mass and another end coupled to the platform. The vibration isolation apparatus were disposed such that they formed a "V". The platform was configured to attach to a shaker apparatus or a vibrating apparatus. The bipod test setup was then subjected to a frequency range of between about 5 Hz and about 2000 Hz.

Figure 6:
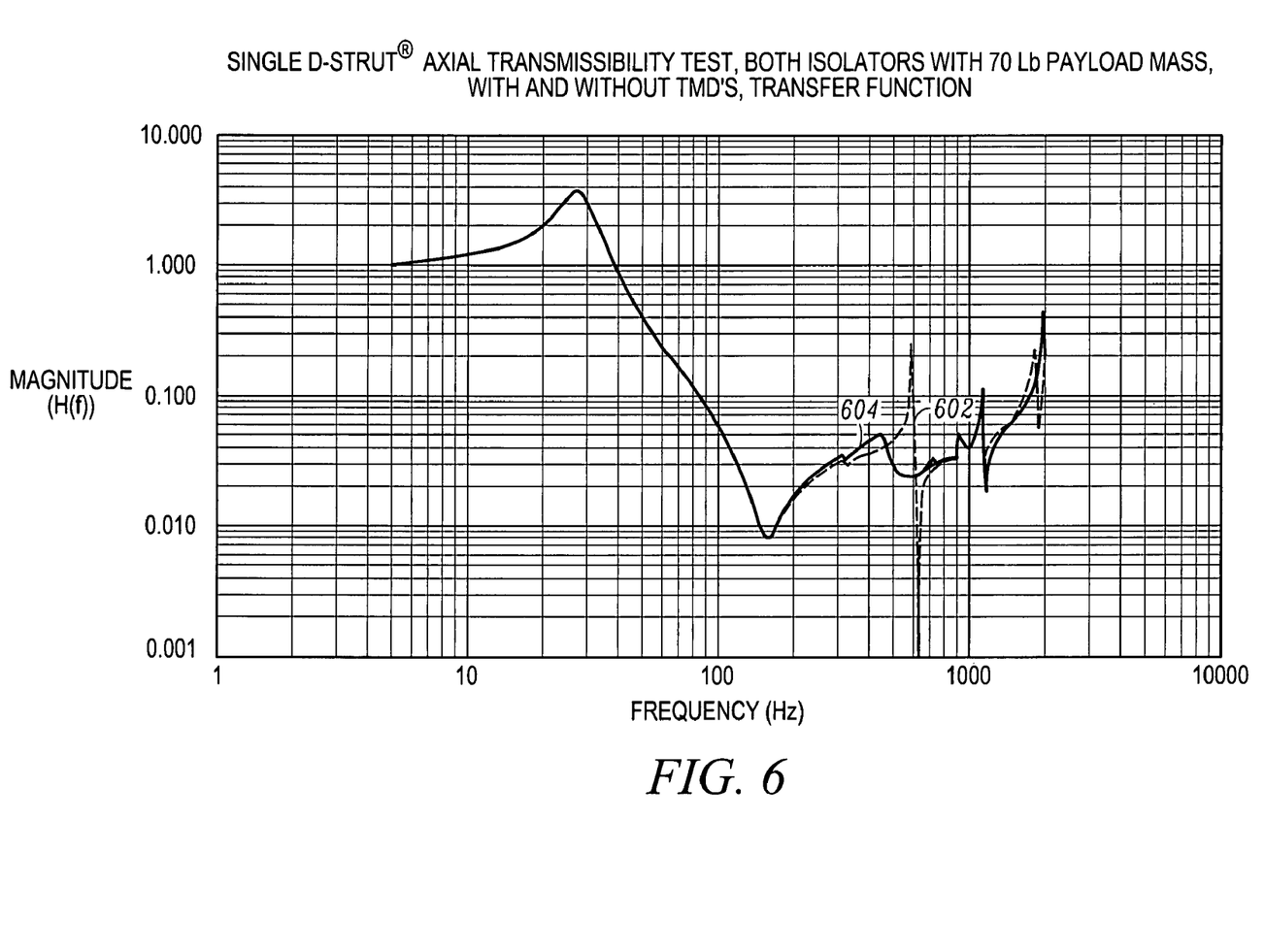
FIG. 6 is a graph comparing resonance magnitudes across a range of frequencies of a conventional vibration isolation apparatus and a vibration isolation apparatus of an exemplary embodiment of the inventive subject matter.
Figure 7:
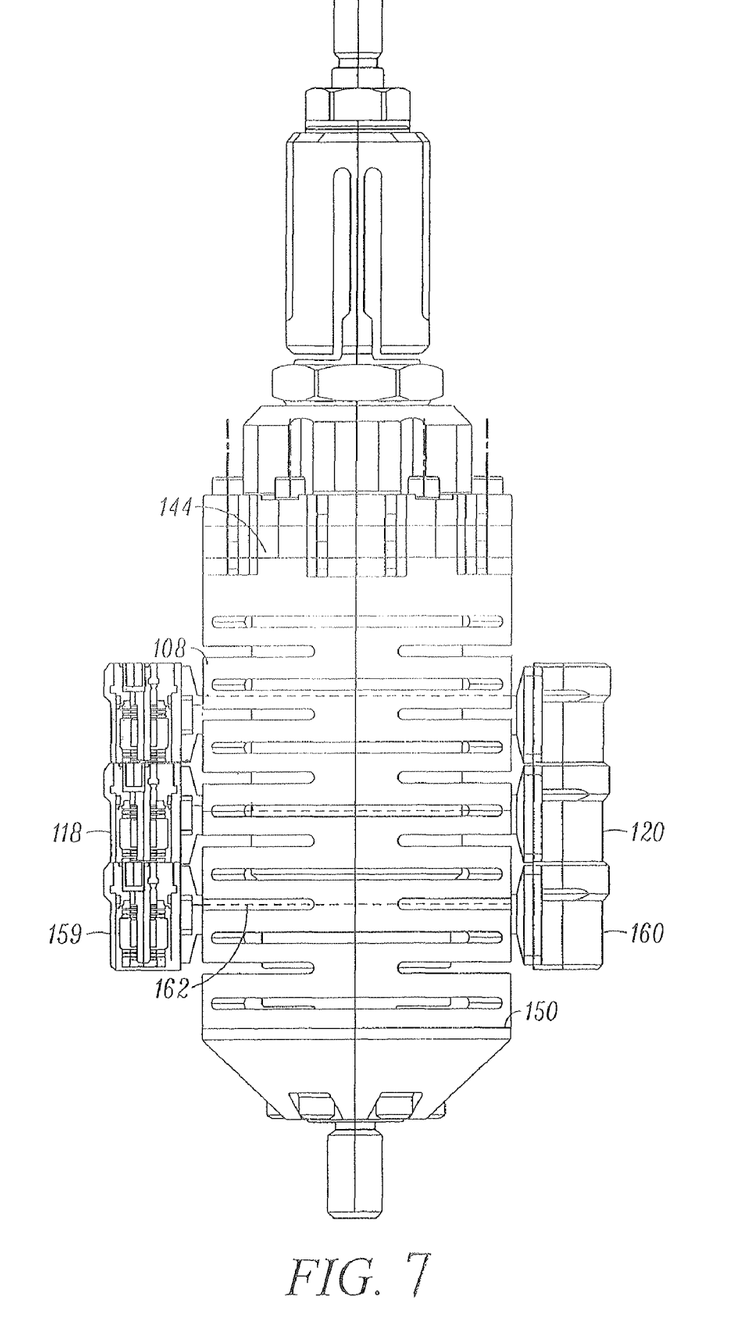
FIG. 7 is a side view of a vibration isolation apparatus in accordance with yet another exemplary embodiment.

First, two vibration isolation apparatus without tuned mass dampers ("standard isolators") were installed into the bipod test setup, and surge magnitude data were collected. Then, the standard vibration isolation apparatus were replaced with two vibration isolation apparatus including tuned mass dampers ("inventive isolators") in accordance with an embodiment coupled to the main spring 116 at a first axial position (e.g. position 152 (FIG. 1)). Surge magnitude data were then collected. As shown in the graph 600 in FIG. 6, the standard vibration isolation apparatus, represented by line 602, and inventive vibration isolation apparatus, represented by line 604, experienced substantially equal similar resonance modes and magnitudes when subjected to frequency ranges between about 5 Hz and about 2000 Hz and between about 0.25 g and 16.25 g. However, the inventive isolators had improved damping of at least 50% over the standard isolators. Specifically, the inventive isolators improved damping over 19 times better than standard isolators.

Embodiments of vibration isolation apparatus have now been described that may have improved damping capabilities as compared to conventional vibration isolation apparatus. In addition, a vibration isolation apparatus of an embodiment may not unpredictably creep when exposed to certain temperatures, and thus, may be capable of attenuating desired resonances.

While at least one exemplary embodiment has been presented in the foregoing detailed description of the inventive subject matter, it should be appreciated that a vast number of variations exist. It should also be appreciated that the exemplary embodiment or exemplary embodiments are only examples, and are not intended to limit the scope, applicability, or configuration of the inventive subject matter in any way. Rather, the foregoing detailed description will provide those skilled in the art with a convenient road map for implementing an exemplary embodiment of the inventive subject matter. It being understood that various changes may be made in the function and arrangement of elements described in an exemplary embodiment without departing from the scope of the inventive subject matter as set forth in the appended claims.

What is claimed is:

1. A vibration isolation apparatus, comprising:
a main spring having a first end and a second end, the main spring configured to resonate when vibrated within a predetermined frequency range with a first axial surge mode having a magnitude; and
a first pair of tuned mass dampers, each coupled to the main spring at a first axial position located substantially equidistantly between the main spring first end and the main spring second end, the first pair of tuned mass dampers spaced apart from each other substantially equidistantly around the main spring, and configured to reduce the first axial surge mode magnitude at least 50% when the main spring is vibrated within the predetermined frequency range.

2. The vibration isolation apparatus of claim 1, wherein the first pair of tuned mass dampers each includes a spring component and a mass disposed on the spring component.

3. The vibration isolation apparatus of claim 2, wherein the spring component is disposed substantially parallel with the main spring.

4. The vibration isolation apparatus of claim 2, wherein the first pair of tuned mass dampers each includes a housing within which the spring component is disposed and the housing is coupled to the main spring.

5. The vibration isolation apparatus of claim 4, wherein the first pair of tuned mass dampers each includes damping fluid disposed within the housing and surrounding the spring component.

6. The vibration isolation apparatus of claim 1, wherein the main spring has an outer surface and the tuned mass damper is coupled to the main spring outer surface.

7. The vibration isolation apparatus of claim 1, wherein the main spring has an inner surface and the first pair of tuned mass dampers is coupled to the main spring inner surface.

8. The vibration isolation apparatus of claim 1, wherein:
the main spring is further configured to resonate with a second axial surge mode having a magnitude when vibrated within the predetermined frequency range; and
the vibration isolation apparatus further comprises a second pair of tuned mass dampers, each coupled to the main spring at a second axial position between the first axial position and the first main spring end and configured to reduce the second axial surge mode magnitude when the main spring is vibrated within the predetermined frequency range.

9. The vibration isolation apparatus of claim 8, wherein:
the main spring is further configured to resonate with a third axial surge mode having a magnitude when vibrated within the predetermined frequency range; and
the vibration isolation apparatus further comprises a third pair of tuned mass dampers, each coupled to the main spring at a third axial position located between the first axial position and the second main spring end and configured to reduce the third axial surge mode magnitude when the main spring is vibrated within the predetermined frequency range.

10. A method of manufacturing a vibration isolation apparatus, the method comprising the steps of:
coupling a pair of tuned mass dampers to a main spring at a first axial position located substantially equidistantly between a main spring first end and a main spring second end,
wherein the pair of tuned mass dampers are spaced apart from each other substantially equidistantly around the main spring, and are configured to reduce a first axial surge mode magnitude of the main spring at least 50% when the main spring is vibrated within a predetermined frequency range.

11. The method of claim 10, wherein the step of coupling comprises coupling the pair of tuned mass dampers to an outer surface of the main spring.

12. The method of claim 10, wherein the step of coupling comprises coupling the pair of tuned mass dampers to an inner surface of the main spring.

* * * * *